W. SIMPSON & W. C. BRAY.
MACHINE FOR SETTING LACING HOOKS.
APPLICATION FILED JAN. 31, 1903.
899,137.
Patented Sept. 22, 1908.
4 SHEETS—SHEET 4.
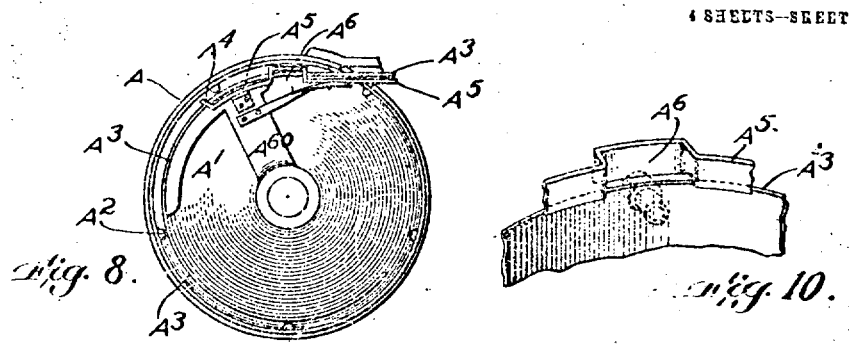
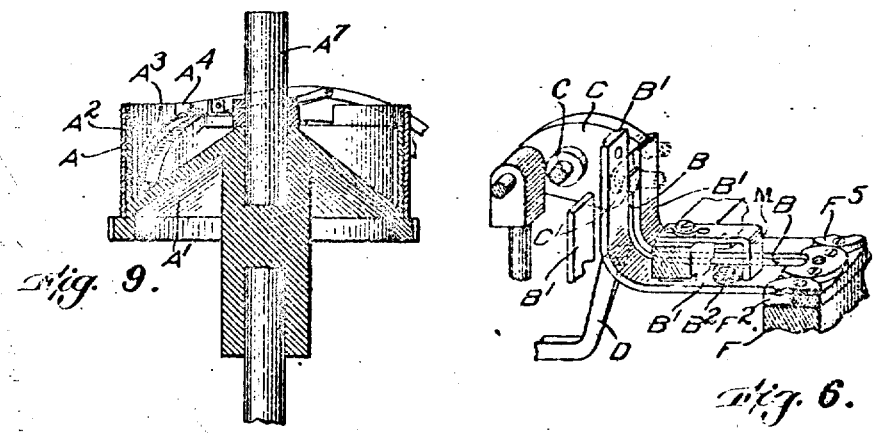
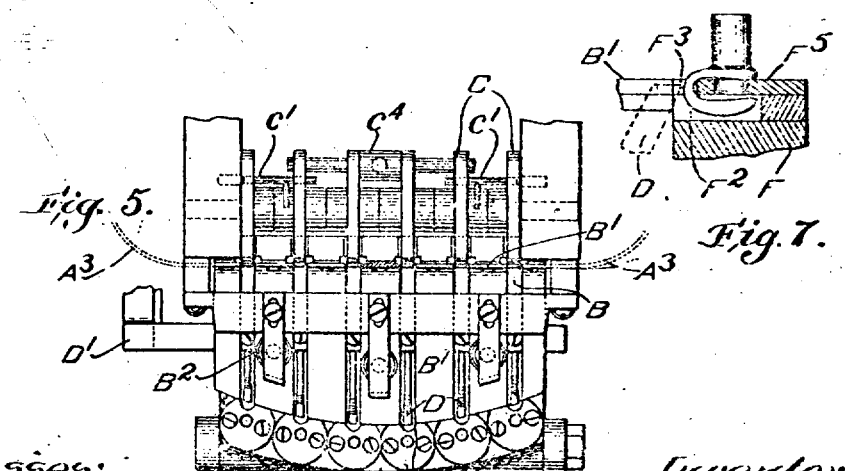

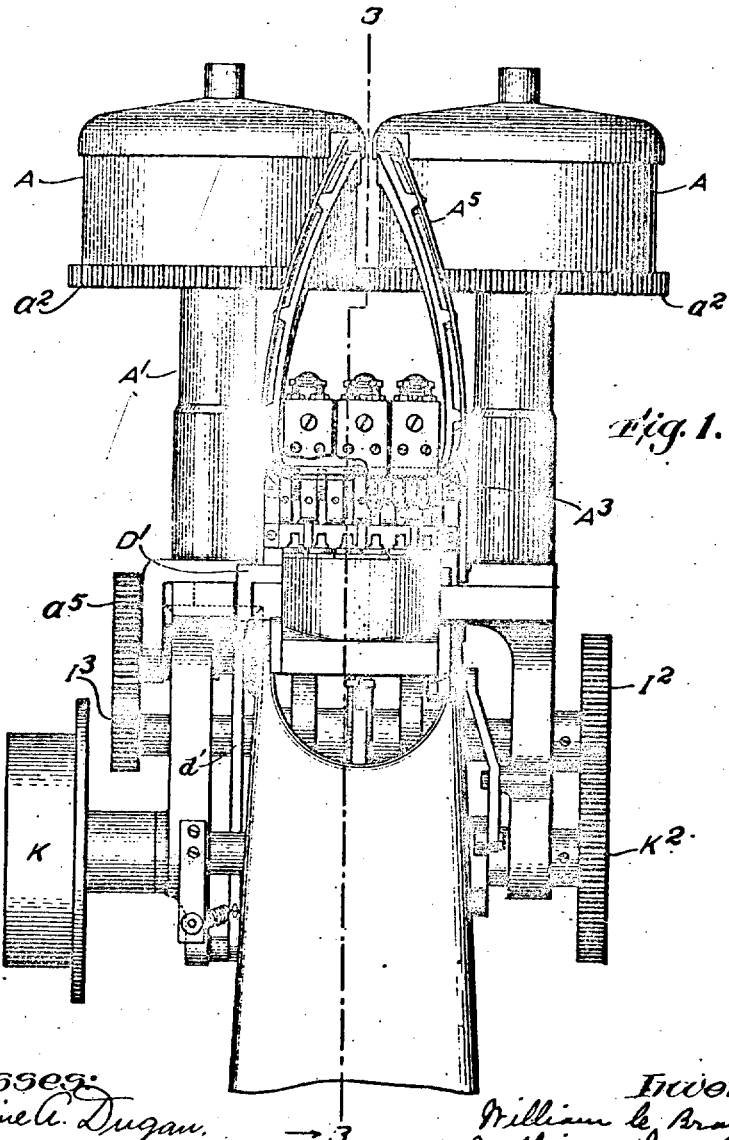

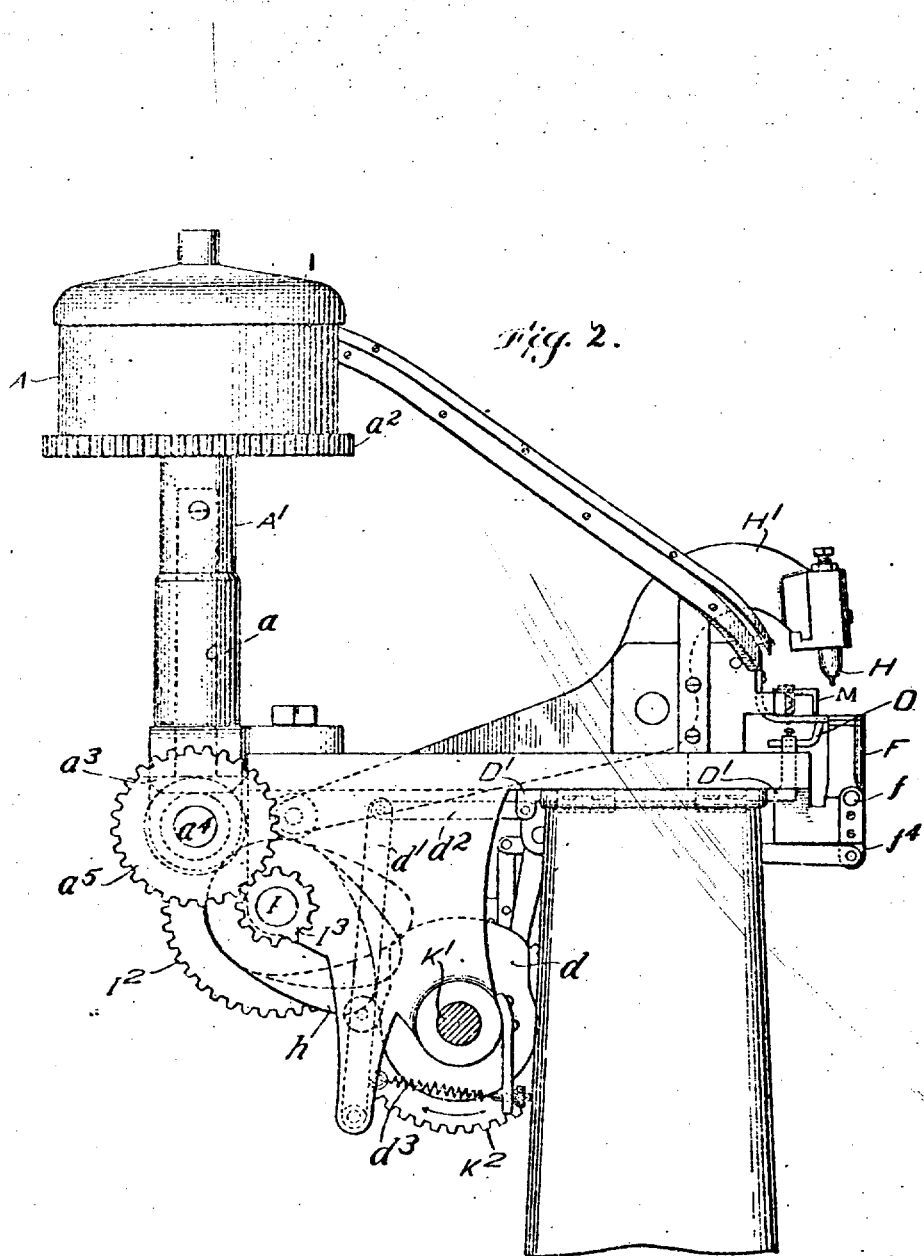

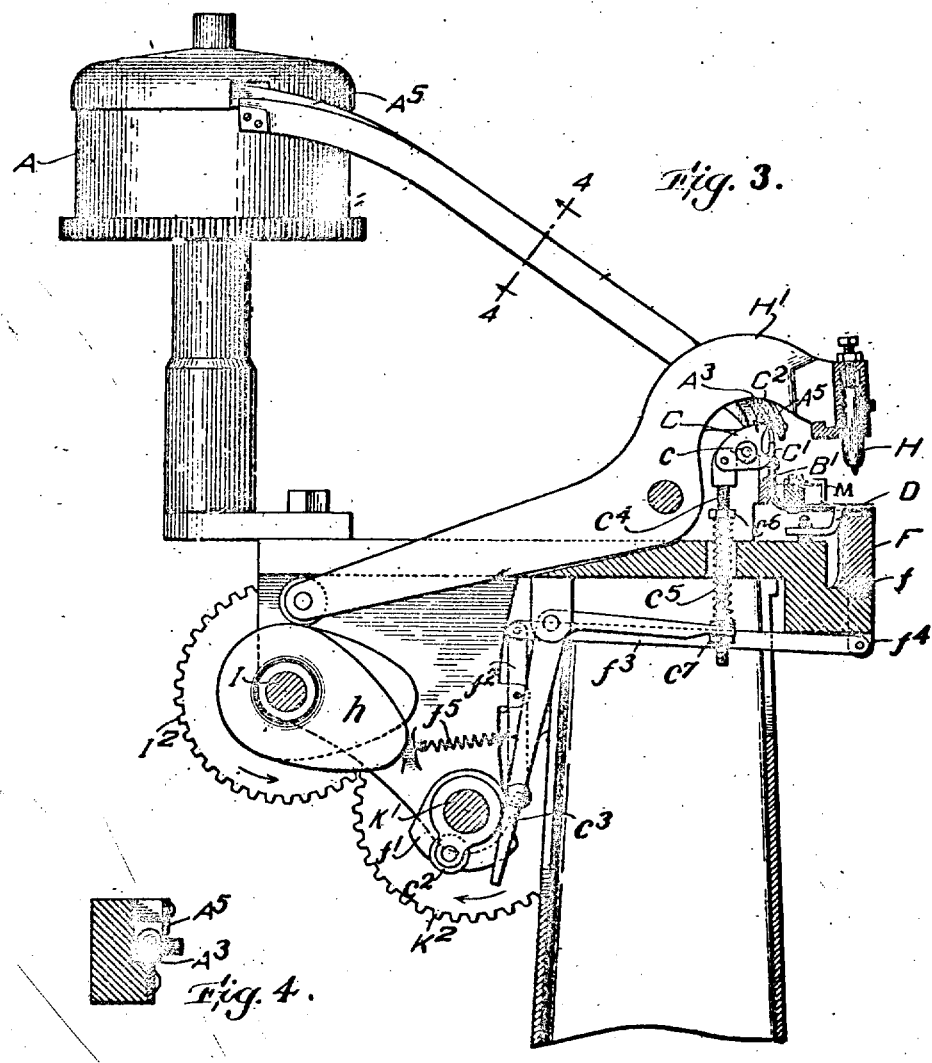

UNITED STATES PATENT OFFICE.

WILLIAM SIMPSON, OF QUINCY, AND WILLIAM C. BRAY, OF NEWTON, MASSACHUSETTS, ASSIGNORS TO TUBULAR RIVET & STUD COMPANY, OF BOSTON, MASSACHUSETTS, A CORPORATION OF MASSACHUSETTS.

MACHINE FOR SETTING LACING-HOOKS.

No. 899,137.   Specification of Letters Patent.   Patented Sept. 22, 1908.

Application filed January 31, 1903.   Serial No. 141,258.

*To all whom it may concern:*

Be it known that we, WILLIAM SIMPSON, of Quincy, in the county of Norfolk, and WILLIAM C. BRAY, of Newton, in the county of Middlesex and State of Massachusetts, have invented certain new and useful Improvements in Machines for Setting Lacing-Hooks, of which the following is a specification.

The invention relates to machines for setting lacing hooks or studs and more especially to a machine which sets a number of hooks at each operation.

In the machine in which the various features of the invention have been embodied the hooks are separated from a mass of hooks and supplied to a raceway down which they slide and from which individual hooks are delivered to a series of setting devices. The setting devices consist of a hook carrier provided with a series of recesses which receive and position the hooks, and a series of anvils which coöperate with the carrier to set the hooks in the material to which they are to be applied. The carrier is arranged to support the hooks with their shanks in a vertical position so that the material may be conveniently inserted and held horizontally in sight of the operator during the setting operation. The hooks are directed into the recesses in the hook carrier by a series of guideways which branch off from the raceway for the hooks and have their delivery ends in register with the recesses in the carrier. At the entrance end of each guideway is a separator which separates individual hooks from the series of hooks in the raceway and supplies them to the guideway. The guideways curve from a substantially vertical into a substantially horizontal plane and as a hook passes into the horizontal part of a guideway it passes in front of a reciprocating feeding finger which pushes it forward into the recess in the carrier and holds it in position during the setting. After the setting is completed the carrier is moved away from the ends of the guideways to disengage the carrier from the hooks.

In the accompanying drawings in which a machine is shown embodying all the features of the invention in the preferred form Figure 1 is a front elevation. Fig. 2 is a side elevation. Fig. 3 is a vertical section on line 3—3 Fig. 1. Fig. 4 is a section on line 4—4 of Fig. 3. Fig. 5 is a detail plan view of the front part of the machine below the setting anvils. Fig. 6 is a perspective detail showing a separator, guideway and the hook carrier. Fig. 7 is a section through the hook carrier showing a hook in position for setting. Figs. 8, 9 and 10 are details of the devices for separating hooks from a mass.

The machine shown in the drawings is designed to set six hooks at one operation and is accordingly provided with a series of six setting devices. There are two sets of feeding devices for supplying the hooks to these six setting devices each set of feeding devices supplying hooks to three of the setting devices, the feeding devices for three of the setting devices being on one side of the machine and the feeding devices for the other three setting devices being of the same construction and arranged on the opposite side of the machine. By thus duplicating the feeding devices the device for separating the hooks from a mass of hooks is required to separate only one half the number of hooks instead of the full number required by the gang of setting devices as would be the case if only one set of feeding devices were used and a constant supply of hooks is assured. A single set of devices may be used however if desired where a single separating device will supply a sufficient number of hooks to the raceway. In describing the machine only one set of feeding devices will be referred to.

The hooks are placed in a hopper A having a rotating lower section A' the cylindrical portion of which is provided with a series of vertical ribs A² (Figs. 8 and 9). Within the ribs A² is a stationary curved plate A³ having an inclined upper edge which extends upward from near the bottom of the hopper and out through an opening near the top of the hopper. As the hooks are carried around with the part A' of the hopper some of the hooks straddle the plate A³ and are forced up along the edge of the plate and out of the mass by the ribs A². As the hooks pass up the plate A³ they pass under a stripping plate A⁴ which extends over the edge of plate A³ and allows only those hooks to pass which are properly hooked onto the upper edge of plate A³. The stripping plate A⁴ is formed by the laterally extended end of a plate A⁵ which is parallel to plate A³ and forms a retaining plate which overlies the shanks of the hooks and retains them on the plate $A^3$. The plate $A^3$ extends downward from the hopper towards the front of the machine and forms the supporting and guiding plate of the raceway for supplying hooks to the setting devices. The plate $A^3$ also extends outside the hopper and forms the retaining plate of the raceway. The retaining plate $A^5$ is provided with an opening $A^6$ within the hopper formed by a lateral offset in the plate through which the hooks which pass under the retaining plate may escape in case the guide plate $A^3$ in advance of the opening is full of hooks. In such case the ribs $A^2$ acting against the end of the series of hooks will cause the series to buckle at the opening where the hooks are not prevented from rising, and thus the hooks will lift off the guide plate at this point until the hooks in advance of the opening can move forward.

The raceway at its lower end turns and extends laterally and horizontally. From the horizontal part of the raceway three guideways B lead to the setting devices. These guideways are formed by the undercut edges of bars $B'$ the edges of the bars being a sufficient distance apart to receive and guide the necks of the hooks and the undercut parts being formed to receive and guide the heads of the hooks so that they pass along the guideway without turning and with the open side of the hook in advance. The tops of the bars $B'$ form a continuation of the plate $A^3$ and the horizontal part of the raceway for the hooks. The bars $B'$ curve from a vertical into a horizontal plane and extend towards the front of the machine. At the entrance end of each guideway where it branches off from the raceway is located a separator C having a lip $C'$ which is in line with the tops of the bars $B'$. These lips in the normal position form a part of the guiding plate of the raceway along which the hooks pass. The separator C has a part $C^2$ which overhangs the lip $C'$ and serves to strike the hook as the separator is operated and advance the hook into the guideway and also serves to prevent a second hook from advancing in the raceway until the separator has returned to normal position.

The separators C are loosely mounted on a shaft $c$ and are rocked simultaneously at the proper time by mechanism to be described. When the separators are in normal position the hooks pass along the horizontal part of the raceway under the influence of the hooks on the inclined part and the guideways B and separators are so arranged that there is a hook in position on each separator lip $C'$. The guideways are so spaced that there is one hook between the guideways. This spacing is used for compactness and simplicity as the space between guideways might be wide enough for two or more hooks. The middle bar $B'$ extends up above the ends of the others and forms a stop for the hooks at the end of each raceway. When the separators are rocked the lips $C'$ are withdrawn from under the hooks thereon so that the hooks may pass down the guideways. If they do not slide down by reason of their weight the part $C^2$ strikes them and gives them a start so that they slide down into the horizontal part of the guideways. Springs $B^2$ are arranged to be engaged by the heads of the hooks so that the hooks shall not slide too far forward in the guideways at this time. When the separators return to normal position the hooks slide along the tops of the bars $B'$ and over the lips $C'$ and again fill the horizontal part of the raceway.

As the hooks slide down the guideways B they pass in front of a series of fingers D which are carried in a slide $D'$ and have their upper ends arranged to move in the guideways. The slide $D'$ is then advanced and the fingers push the hooks forward into the recesses of the hook carrier F. There is a recess at the exit end of each guideway and each recess consists of a pocket $F^2$ and a notch $F^3$ in a plate $F^5$ which is arranged to lie between the head of the hook and the shank and support the hook during the setting. The pocket $F^2$ receives the head of the hook and the notch $F^3$ receives the neck, and together they position the hook for the setting. The plate is rigidly supported at both sides and at the rear of the pocket and therefore the pressure on the head is evenly distributed and the hook held in an upright position during the setting. The hook is held in position on the plate during the setting by the fingers D which remain in their advanced position during the setting.

The carrier F consists of a block on the upper end of which the supporting plate or plates and the recesses for the hooks are formed. This block is pivoted at $f$ and is swung away from the guides $B'$ after the setting to disengage the recesses from the hooks. At the same time the fingers D are retracted, and the separators C operated to supply hooks to the guideways after which the fingers are again advanced to carry the hooks into the recesses which have been returned into position at the ends of the guideways. The shanks of the hooks are spread to set and clench them in the material by means of anvils H. These anvils are carried in the ends of three levers $H'$ there being two anvils in each lever. These levers are operated successively by three cams $h$ on the cam shaft I. By thus mounting and operating the anvils the hooks are set at one operation with less power and less strain upon the machine than would be the case were all the anvils operated simultaneously. The recesses $F''$ may be arranged on a straight line or on a curve as shown to suit the class of work being done.

To adapt the same machine for setting different numbers of hooks the outer separators C are connected with the adjacent separators by sliding pins $c'$ which engage holes in the separators. One or both of the outer separators may be rendered inactive by sliding its pin so that it disengages the inner separator and engages a hole in the frame. The separator now remains at rest and the lip $C''$ acts as a fixed part of the raceway for the hooks.

The machine is driven from a belt passing over a pulley K and this pulley may be connected with the main shaft $K'$ by any suitable devices which will give the shaft a single revolution each time it is tripped by the operator as is common in hook setting machines. The shaft $K'$ carries the cams for operating the separators C the finger slides $D'$ and the hook carrier F. The separators are operated by a cam roll $c^2$ (Fig. 3) arranged to strike a lever $c^3$ the other end of which is connected with the four inner separators. The connection consists of a link $c^4$ pivoted to the separators and extending through the end of lever $c^3$. A spring $c^5$ is interposed between a collar $c^6$ on the link and the upper side of the lever and holds the lever against a nut $c^7$ on the link. The spring forms a yielding connection in case a hook becomes jammed and prevents the movement of the separator.

The slide $D'$ is operated by a cam $d$ Fig. 2 which engages a roll on a lever $d'$ the upper end of which is connected by a link $d^2$ with the slide $D'$. The slide is guided in the frame and has a cross bar in which the fingers D are adjustably secured. The roll is held against the cam by a spring $d^3$. The hook carrier F is rocked by a cam $f'$ Fig. 3 arranged to act on a lever $f^2$ the upper end of which is connected by a link $f^3$ with an arm $f^4$ depending from carrier F. The lever is held against the cam by a spring $f^5$. The shaft I which carries the cams $h$ for operating the setting anvils is driven from shaft $K'$ by means of gears $K^2$ and $I^2$. The rotating part $A'$ of each hopper is secured to the upper end of a vertical shaft $a$ and these parts are geared together by gears $a^2$ formed thereon so that they revolve in unison and in opposite directions. One of the shafts $a$ is provided with a bevel gear $a^3$ at its lower end which meshes with a similar gear on a short shaft $a^4$ driven from shaft I through gears $I^3$ and $a^5$. The stationary parts of the hoppers and the upper ends of the plates $A^3$ and $A^4$ are supported on arms $A^{60}$ secured to studs $A^7$ fitted loosely in holes in the parts $A'$ of the hoppers.

Normally the machine stands as shown in the main view of the drawings with the fingers D advanced and holding the hooks in the recesses $F'$ as shown in Fig. 7. The material is then placed in position against guides M and the machine started. The anvils first descend and set the hooks; then the hook carrier is operated to disengage the hooks and at the same time the fingers D are retracted and the separators C operated; the carrier F is then returned and the fingers D advanced to carry the hooks into the recesses $F^2$, $F^3$. The parts then remain in this position until again thrown into operation. The raceway and guideways branching therefrom form a simple and efficient means for feeding hooks to a series of setting devices and are well adapted for feeding hooks to setting devices which present the hooks with the shanks vertical and also admit of a close arrangement of the setting devices.

While the construction shown is a simple and efficient embodiment of the features of the invention it will be understood that changes and modifications therein may be made without departing from the invention, the essential features of which are referred to in the claims.

What we claim and desire to secure by Letters Patent is:

1. A machine for setting lacing hooks having in combination a hook carrier provided with a series of recesses and supporting plates to receive and support a series of hooks with their shanks vertical, means for feeding a series of hooks to said recesses and plates, reciprocating anvils for coöperating with said carriers to set the hooks, and means for moving said carrier to disengage the carrier from the hooks after the setting, substantially as described.

2. A machine for setting lacing hooks having in combination, a raceway for the hooks, and means for separating a plurality of hooks from the series of hooks in the raceway and feeding them to a series of setting devices, substantially as described.

3. A machine for setting lacing hooks having in combination, a raceway for the hooks, a series of guideways leading from different points in the raceway, and means for transferring individual hooks from said raceway to each of said guideways, substantially as described.

4. A machine for setting lacing hooks having in combination, a hook carrier provided with a series of recesses and supporting plates to receive and support a series of hooks, a series of guideways leading to said recesses and plates, and a raceway for supplying hooks to said series of guideways, substantially as described.

5. A machine for setting lacing hooks having in combination, a hook carrier provided with a series of recesses and supporting plates to receive and support a series of hooks, a raceway for the hooks, a series of guideways extending from said raceway to said recesses and plates, a series of separators for separating individual hooks from the series in the race-way and delivering them into the guideways and means for advancing the hooks in the guideway to the recesses and plates, substantially as described.

6. A machine for setting lacing studs having in combination, a hopper for the hooks, a guiding plate therein, a retaining plate for holding the hooks on the guiding plate, means for forcing the hooks along the guiding plate, and an opening in the retaining plate for the escape of the hooks when their movement along the guiding plate in advance of said opening is prevented, substantially as described.

7. A machine for setting lacing hooks having in combination, a raceway for the hooks, a series of guideways leading from said raceway and separated from each other by the width of one or more hooks, and separators for transferring individual hooks to said guideways, substantially as described.

8. A machine for setting lacing hooks having in combination, a hook carrier provided with a series of recesses for receiving and supporting a series of hooks, reciprocating anvils coöperating with said carrier to set the hooks, means for operating said anvils successively, and means for feeding hooks to said recesses, substantially as described.

9. A machine for setting lacing hooks having in combination, a series of setting devices, means for automatically feeding hooks to said setting devices and means for operating said setting devices successively during each setting operation, substantially as described.

10. A machine for setting lacing hooks having in combination, a hook carrier having a series of recesses and supporting plates, a series of guideways registering with said recesses, means for supplying hooks to said guides, means for advancing the hooks in said guides and holding them in said recesses and on said plates during the setting, and means for moving the carrier away from the guideways to disengage the recesses and plates from the hooks, substantially as described.

11. A machine for setting lacing hooks having in combination, a guideway for directing the hooks with the open side in advance, a hook carrier having a pocket with an open front to register with the guideway, a plate on the carrier provided with a notch for engaging the neck of the hook, means for feeding the hook along the guideway with the open side in advance, means for moving the carrier away from the guideway after each setting operation and returning it before the next setting operation, substantially as described.

12. A machine for setting lacing hooks having in combination, a hook carrier provided with a series of recesses and supporting plates, a series of guideways registering with said recesses and plates, means for feeding hooks through said guideways to said recesses and plates, a series of reciprocating anvils coöperating with said carrier, and means for moving the carrier away from the guideways after each setting operation and returning it before the next setting operation, substantially as described.

13. A machine for setting lacing hooks having in combination, a hook carrier provided with a recess and supporting plate for the hooks, a guideway registering with said recess, means for feeding hooks through the guideway to the recess and plate, a reciprocating anvil coöperating with said carrier, and means for moving the carrier away from the guideway after each setting operation to disengage the carrier from the hook and returning it before the next setting operation to receive the succeeding hook, substantially as described.

14. A machine for setting lacing hooks having in combination, a hook carrier provided with a series of recesses and supporting plates, a raceway for the hooks, a series of guideways extending from said raceway to said recesses and plates, a series of reciprocating anvils coöperating with said carrier, and means for moving the carrier away from the guideways after each setting operation and returning it before the succeeding setting operation, substantially as described.

15. A machine for setting lacing hooks having in combination, a raceway for the hooks, a series of guideways extending from said raceway, a hook carrier provided with a series of recesses and supporting plates registering with said guideways, reciprocating anvils coöperating with said carrier, and means for disengaging the carrier from the hooks after each setting operation, substantially as described.

16. A machine for setting lacing hooks having in combination, a raceway for the hooks, a series of guideways leading from said raceway, means for transferring individual hooks from the raceway to each of said guideways, a hook carrier provided with a series of recesses and supporting plates registering with said guideways, and a series of reciprocating anvils coöperating with said carrier, substantially as described.

17. A machine for setting lacing hooks having in combination, a hook carrier provided with a series of three or more recesses and supporting plates to receive and support a series of hooks, means for engaging and positively feeding a series of hooks to said recesses and plates, anvils for coöperating with said carrier to set the hooks, and means for moving said carrier to disengage the carrier from the hooks after the setting, substantially as described.

18. A machine for setting lacing hooks having in combination a hook carrier provided with a series of three or more supporting plates for receiving and supporting a series of hooks, means for engaging and positively feeding a series of hooks onto said plates, anvils for coöperating with said plates to set the hooks, and means for moving said plates to disengage them from the hooks after the setting, substantially as described.

19. A machine for setting lacing hooks, having, in combination, a hook carrier provided with a series of supporting plates to receive and support a series of hooks, a series of guideways for delivering hooks to said plates, means for engaging and feeding a series of hooks along the guideways and on to the plates, anvils for coöperating with the carrier to set the hooks, and means for moving the plates to disengage them from the hooks after the setting, substantially as described.

In testimony whereof we have affixed our signatures, in presence of two witnesses

WILLIAM SIMPSON.
WILLIAM C. BRAY.

Witnesses:
F. A. POPE,
GEO. E. STROUT.